United States Patent [19]

Siecker

[11] 4,226,888

[45] Oct. 7, 1980

[54] MANUFACTURE OF PASTA FILATA CHEESE

[75] Inventor: Cornelis Siecker, Woodford, Australia

[73] Assignee: Caboolture Co-Operative Associates Limited, Caboolture, Australia

[21] Appl. No.: 934,968

[22] Filed: Aug. 18, 1978

Related U.S. Application Data

[63] Continuation-in-part of Ser. No. 832,098, Sep. 9, 1977, abandoned.

[51] Int. Cl.² .............................................. A23C 19/02
[52] U.S. Cl. ...................................... 426/36; 426/582
[58] Field of Search ................. 426/36, 582, 516, 518, 426/491

[56] References Cited

U.S. PATENT DOCUMENTS

| | | | |
|---|---|---|---|
| 3,175,915 | 3/1965 | Murphy | 426/582 X |
| 3,449,127 | 6/1969 | Budahn | 426/582 |
| 3,531,297 | 9/1970 | Kielsmeier et al. | 426/582 X |

OTHER PUBLICATIONS

Davis, T. G., Cheese, vol. I, American Elsevier Publ. Co., Inc., N.Y., 1965 (pp. 277–284).

*Primary Examiner*—David M. Naff
*Attorney, Agent, or Firm*—Schwartz, Jeffery, Schwaab, Mack Blumenthal & Kock

[57] ABSTRACT

A process for the manufacture of pasta filata cheese wherein instead of brining after the stretching step, the curd is dry salted subsequent to or simultaneous with the milling step, rested for a period of at least 5 minutes, and mechanically stretched in hot water for a period of from 4.5 to 6.5 minutes before shaping and cooling.

5 Claims, 1 Drawing Figure

U.S. Patent   Oct. 7, 1980   4,226,888
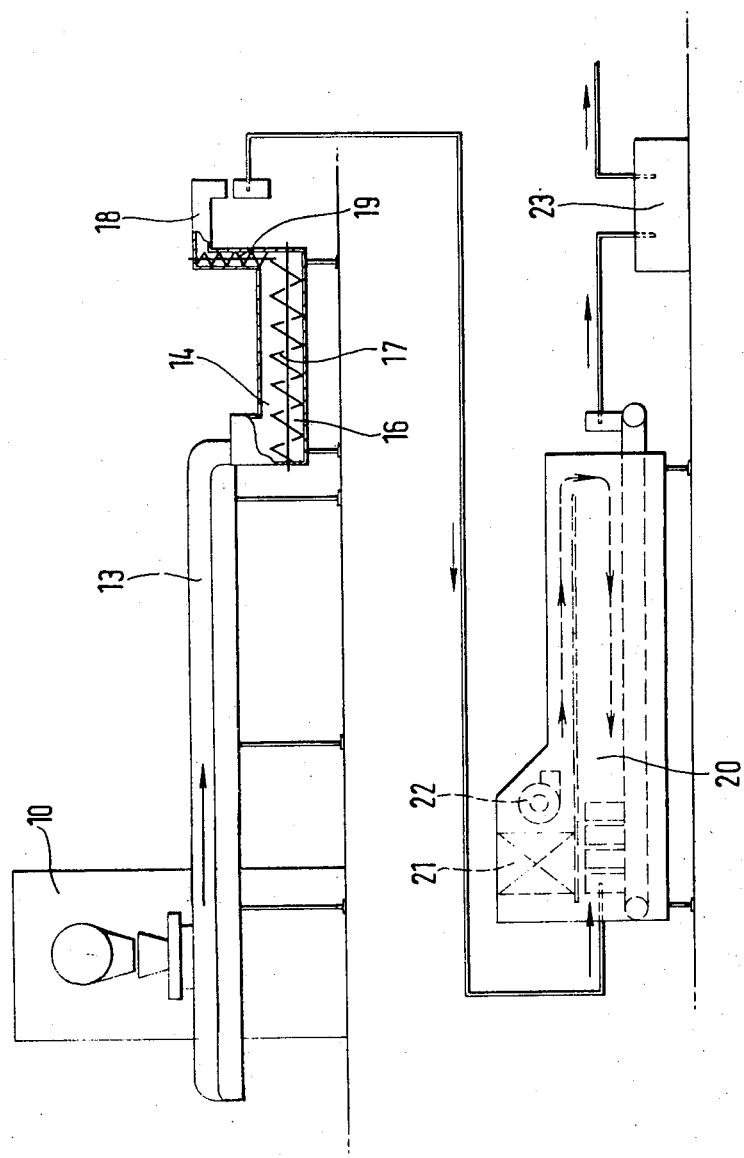

MANUFACTURE OF PASTA FILATA CHEESE

This application is a continuation-in-part of my copending application Ser. No. 832,098 filed Sept. 9, 1977 and now abandoned.

BACKGROUND OF THE INVENTION

This invention relates to cheese manufacture, particularly cheese of the pasta filata type.

Pasta filata cheeses are formed by submerging the curd in hot water and stretching to give a resultant filamentary configuration before further processing. They include pizza, mozzarella, scarmorze, becchi, provole, provolette, salame, provolone, mandarini and provolone giganti cheeses. The conventional process for making these cheeses is described in detail in Reinhold, Italian Cheese Varieties, Volume 1, Pfizer Cheese Monographs (1963).

Pasta filata cheese is produced initially in the same manner as conventional cheddar type cheeses. It can be manufactured from skim or whole milk, or a mixture of skim and whole milk. The milk may be raw, but is preferably pasteurized. When the milk is pasteurized, a starter organism such as mixed heat resistant lactobacilli can be added. After a ripening time of from 35 to 45 minutes, the milk may be set or coagulated by the addition of rennet diluted in water. The setting time is normally 30–35 minutes to form a smooth thick curd.

After the coagulum has reached the proper consistency resembling that of cheddar cheese, it is cut with curd knives, agitated and then cooked. The curd may then be drained with the curd particles agglomerating if left undisturbed. The curd may then be cut into blocks, which are then turned repeatedly. The blocks may be recut several times. During this operation (i.e. allowing the curd to agglomerate and then cutting and recutting) whey may be expelled from the curd and drained off through an outlet in the cheese vat.

When the above described operation is completed, and the curd reached a predetermined acidity, the cheese blocks may then be cut into small chunks or pieces in a cheese mill.

At this point cheddar cheese is produced by dry salting wherein the milled curd is mixed thoroughly with dry salt, placed into suitable drums, de-aerated to prevent mould growth and then cured such as by being maintained between 65° and 80° F. until a pH of around 5.0 is reached. The curing operation may take a very long time (e.g. from 5 weeks to 12 months).

In contrast to the production of cheddar cheese, cheese of the pasta filata type after milling is stretched in hot water, moulded to the desired shape and size, immersed in brine and then cooled. Alternatively the agglomerating, cutting and turning steps may be omitted and the curd soaked in hot water after cooking, the soaking being performed at an elevated temperature and lactose extracted therefrom before the curd is stretched, moulded, immersed in brine and cooled.

Therefore the principal difference between cheddar cheese and pasta filata cheese will be apparent, i.e. the latter is stretched or extruded to produce long filaments at one stage in its production which after the cooling step are ready for packaging and sale. On the other hand the cheddar cheese is always in block form and has to be aged for some considerable time before being ready for packaging.

Hitherto in the production of cheese of the pasta filata type, the usual method of salting by immersion in brine is unsatisfactory because the salt did not fully penetrate into the cheese, leaving an outer salted zone and an inner unsalted zone. This is not satisfactory because as salt is a preservative, the outer zone will be preserved at the expense of the inner zone, which tends to deteriorate and result in possible off-flavouring of the cheese. Therefore brined cheese was not always acceptable in quality. The process is also slow with the brining operation taking up to 72 hours in some cases. In addition the large brining vats require special housing space, and also the brining liquid is corrosive and its elimination would greatly reduce corrosion.

Attempts have been made to overcome this problem by direct salting of the milled pasta filata type cheese instead of brining. However this direct salting was found to be totally unsatisfactory because in the extended period of 15–30 hours of salting the cheese was rendered brittle and too acidic and could not be stretched in the subsequent extrusion step although direct salting has been satisfactory in production of cheddar cheese because it is always in the form of blocks or slabs and does not have a stretching step. Its use in production of pasta filata type cheese has not been practised on a large scale heretofore because of this reason.

SUMMARY OF THE INVENTION

The invention therefore has as its object a method of making pasta filata type cheese in order to overcome or at least alleviate the abovementioned problems of the prior art.

The inventive step in relation to the present invention resides in the concept of instead of brining cheese after stretching, the cheese is dry salted during or subsequent to milling and rested for a minimum time of 5 minutes (more preferably 6 minutes) to allow the cheese to thoroughly absorb the salt desirably without having a titratable acidity exceeding 0.95 (otherwise the salt will be washed off in the stretching step) and the cheese is then stretched in hot water for a time of from 4.5 to 6.5 minutes (preferably 5 to 6 minutes) before cooling.

The above described parameters are critical in the performance of the invention. If the stretching time is less than 4.5 minutes, the heat required to penetrate into the curd to facilitate stretching would not be enough. If the stretching time is greater than 6.5 minutes, the salt in the curd would have started to absorb water and hence the curd would be subsequently softened and would not be suitable for consumption.

Also in relation to the resting time, if this time is left for too long (e.g. 10–15 hours) the curd may become too acidic, e.g. having a titratable acidity exceeding about 0.95. This causes excess separation of butter fat and this in turn will adversely affect the stretching operation and subsequent texture and quality of the cheese. A suitable resting time is therefore from 6 to 10 minutes. At this stage the cheese should also have a titratable acidity between about 0.75 and about 0.95. The titratable acidity is determined in a neutralization reaction using 0.1N NaOH and phenolphthalein as indicator. If the titratable acidity is less than about 0.75 the cheese texture may not be suitable for stretching. The titratable acidity of 0.75 to 0.95 corresponds approximately to a pH of about 5.2 to about 5.4.

It has now been found that when the combination of dry salting and stretching as described above is carried out to pasta filata cheese, cheese is produced which has an improved texture and a more acceptable quality than cheese produced by the brining step. Hence it is considered that pasta filata cheese will have a greater appeal to consumers than previously.

DESCRIPTION OF PREFERRED EMBODIMENT

After milling, the milled curd may be transferred onto a moving conveyor belt wherein salt is applied from a hopper via a rotating salt when located at the base of the hopper onto the moving bed of curd. The provision of the salt wheel enables the salt to be applied evenly to the curd. The curd impregnated with salt may then be conveyed to a rotating mixing drum to ensure even penetration of the salt.

The dry-salted curd may be delivered to a conveyor, and carried thereby to a retention conveyor, which delivers the product to a curd stretcher. The retention conveyor conveys the salted curd at a fairly slow rate, the curd being retained therein for a period of at least five and more suitably from 6 to 10 minutes, to permit the thorough absorption of the salt, or mellowing of the curd.

The mellowed curd when delivered from the retention conveyor to the curd stretcher may be immersed in hot water, stretched from 4.5 to 6.5 minutes, and then extruded into hoops or moulds.

The filled hoops may then be cooled by being conveyed through a cooling tunnel by means of any suitable conveyor, the cheese being retained in the cooling tunnel for a period of about ninety minutes, so that the cheese will be satisfactorily firmed.

As the hoops are discharged from the cooling tunnel, the cheeses may be taken from the hoops and vacuum packed in barrier bags, the cooling of the cheeses being completed in a cold room.

It will be found that the process according to the invention by means of which the curd is dry-salted at an early stage of the production rather than being salted in brine in a final stage of its manufacture results in considerable savings in time and the manufacture of a superior product.

In order that the invention may be better understood, one embodiment will be described in more detail with reference to the accompanying drawing, which shows diagrammatically apparatus for carrying out the successive steps of the process.

Preliminary to the process to be described, the curd is formed and cheddared. The milk is standardised, pasteurised and set, and the curd cut, cooked and drained in the usual manner. The cheddared curd so produced is cut in a mechanical curd mill 10 and dry salt added at a proportion of 3% by weight.

The salted curd is fed to a belt conveyor 11 and passed to a retention conveyor 13.

The curd is rested by being retained in conveyor 13 for from five to ten minutes to enable thorough absorption of the salt.

The curd passes from conveyor 13 to a curd stretcher 14 having a horizontal auger 15 in a trough 16, within which 3% salted hot water at between 70° C. and 80° C. is circulated. A goose-neck type extruder 18 with vertical auger 19 draws the curd away from auger 17.

The time taken for the curd to traverse stretcher 16 and extruder 18 should be not less than five minutes.

The hot curd is directed from extruder 18 into stainless-steel hoops which are passed through a tunnel 20 cooled by counter-current air from a refrigerator 21 and blower 22, until the cheese is cooled sufficiently to retain its shape. Typically, the retention time in tunnel 20 is some 75 minutes.

The cheese is then removed from the hoops and packaged at 23.

The process of the invention will be illustrated with particular reference to an Example.

EXAMPLE

Standardising and Pasteurising 8.00AM Standardise milk to 2.2% milk fat. Pasteurise milk 163 deg.F. (72 deg.C.) for 15 seconds. Cool to 89 deg.F. (32 deg.C.) and pump the milk into cheese vat. Vat capacity 1100 gallons. Introduce starter organism 0.4% Lacto Bacillus Bulgaricus, 0.8% Streptococcus Thermophilus and 1.0% Streptococcus Lactis or Streptococcus Cremoris, as soon as the milk is pasteurised. A ripening time of the milk before setting is recommended 35 to 45 minutes.

Setting the Milk 8.45AM Dissolve 330 grams of Calcium Chloride (30 grams per 100 gallons of milk) into 2 gallons of hot sterile water and add to the milk. Introduce 33 oz. of Rennet diluted in 4 gallons sterile cold water into the milk (3 oz. of Rennet per 100 gallons of milk). Setting acidity 0.18%.

Cutting the Curd 9.20AM A smooth thick curd forms in 30 to 35 minutes. Check it with a round sterile rod for the proper strength as with Cheddar. At the optimum point cut the curd with ⅜in. knives. 5 minutes after cutting start gently with agitating of the vat. Whey acidity at this point will be 0.125%.

Cooking the Curd 9.35AM Cook the curd to 115 deg.F. (46 deg.C.) using steam or hot water in the vat jacket for 45 minutes. At the finish of the cooking, the whey acidity will be 0.14% to 0.15%.

Draining the Curd 11.10AM At a whey acidity of 0.18% pump the curd particles and whey into a draining vat and remove whey as quickly as possible. Dry stir if the curd particles are overmoist. As soon as the curd particles are left undisturbed, they will mat together rather quickly. Cut the matted curd into patties, and turn the patties as in the cheddar process with 8 to 10 minute intervals. Double the curd patties at the second last turn. For the above process the Cheddar Master, Bell Siro 2 or the Lactomatic can be used.

Cutting, Salting and Stretching the Curd 12.25PM When the whey draining from the curd patties reaches an acidity of 0.8% the cheese is ready for cutting, salting and stretching. A mechanical curd mill is used for cutting the curd patties as for the cheddar and salted at the rate of 3lb. salt per 100lb. of curd. The Bell Siro 3, Lactomatic or any other mechanical device can be used for this purpose. The curd after salting for a minimum of 6 minutes is transferred to a mechanical stretcher. The stretcher used in the process consists of a horizontal trough 118in. long. In this an auger is turning at a speed of 14 r.p.m. Hot water is circulated in the trough at a temperature of 165 deg.F. (75 deg.C.). A vertical goose neck type extruder is mounted on the end of the trough, inside the part mounted on the trough a vertical auger is turning at a speed of 15 r.p.m. to draw the curd away from the horizontal auger. Time from the curd entering the hot water until extruder 5 to 6 minutes. Direct the hot curd from the extruder into stainless hoops. Cool the cheese in the hoops until the cheese is cold enough to be removed from the hoops and to be packed without losing shape.

A typical pizza cheese produced by this process has the following composition: PH=5.2; Fat 23%; F.D.B. 39%; Moisture 42%; Salt 1.3% (all percentages by weight).

The salt content may be varied by salting the curd after cutting at a higher or lower rate. The process is applicable to ripened and unripened pasta filata cheeses.

I claim:

1. A process for producing pasta filata cheese comprising the steps of:
   (a) standarizing the milk;
   (b) setting the milk;
   (c) cutting, cooking and draining the resultant curd;
   (d) sub-dividing the curd;
   (e) dry salting the curd subsequently to or simultaneously with step (d);
   (f) resting the salted curd for a period of at least 5 minutes to enable the salt to be thoroughly absorbed into the curd and until the curd has a titratable acidity between about 0.75 and about 0.95;
   (g) mechanically stretching the curd in hot water for a period of from 4.5 to 6.5 minutes; and
   (h) cooling and shaping the cheese.

2. A process as claimed in claim 1 wherein the salted curd is rested for 6 minutes before step (g).

3. A process as claimed in claim 1, in which stretching occurs in hot water at 70–80° C.

4. A process as claimed in claim 1, in which the curd remains in said stretcher for 5 to 6 minutes.

5. A process as claimed in claim 1 wherein the salted curd is rested for 5 to 10 minutes before step (g).

* * * * *